United States Patent [19]

Lausberg et al.

[11] Patent Number: 4,782,117
[45] Date of Patent: Nov. 1, 1988

[54] THERMOPLASTIC MOLDING MATERIALS BASED ON NYLONS AND POLYCARBONATES

[75] Inventors: Dietrich Lausberg, Ludwigshafen; Horst Reimann, Worms, both of Fed. Rep. of Germany

[73] Assignee: BASF Aktiengesellschaft, Fed. Rep. of Germany

[21] Appl. No.: 14,843

[22] Filed: Feb. 13, 1987

[30] Foreign Application Priority Data

Feb. 21, 1986 [DE] Fed. Rep. of Germany ....... 3605573

[51] Int. Cl.$^4$ ............................................. C08L 69/00
[52] U.S. Cl. ..................................... 525/146; 525/66; 525/423; 525/432; 525/433
[58] Field of Search ................. 525/423, 430, 930, 66, 525/146, 432, 433

[56] References Cited

U.S. PATENT DOCUMENTS 4,317,891 3/1982 Sakano et al. ..................... 525/66

FOREIGN PATENT DOCUMENTS

| | | |
|---|---|---|
| 3332924 | 9/1983 | Fed. Rep. of Germany . |
| 28350 | 8/1973 | Japan . |
| 33103 | 9/1974 | Japan . |
| 1147 | 1/1975 | Japan . |
| 116541 | 9/1975 | Japan . |
| 30255 | 3/1976 | Japan . |
| 104567 | 9/1977 | Japan . |
| 16033 | 1/1982 | Japan . |
| 68368 | 4/1984 | Japan . |

*Primary Examiner*—Theodore E. Pertilla
*Attorney, Agent, or Firm*—Oblon, Fisher, Spivak, McClelland & Maier

[57] ABSTRACT

Thermoplastic molding materials based on
(A) nylons and
(B) polycarbonates, and containing 0.1–30% by weight of
(C) a polymer containing hydroxyl groups, —OH.

The molding materials have good surface characteristics and high impact strength, especially at low temperatures.

23 Claims, No Drawings

THERMOPLASTIC MOLDING MATERIALS BASED ON NYLONS AND POLYCARBONATES

BACKGROUND OF THE INVENTION

The present invention relates to thermoplastic molding materials based on
(A) nylons and
(B) polycarbonates.

The invention further relates to the use of such molding materials for the production of moldings, and to the moldings thus obtained.

DISCUSSION OF THE BACKGROUND

Freshly injection-molded nylons (especially when these are partially crystalline) reach their maximum toughness only as a result of water absorption following a conditioning treatment. This conditioning can be effected simply by storage exposed to the atmosphere. However, this procedure is slow, and it is therefore usual to treat finished nylon moldings with water until they have absorbed about 3% of water. As a rule, this is done by treating the moldings with warm water in an immersion tank.

A water content of 3% corresponds roughly to the water absorption at 50% relative atmospheric humidity. In order to ensure uniform distribution, within the molding, of the water molecules which have penetrated through the surface, an additional lengthy storage at high atmospheric humidity is frequently required.

It will be clear from the foregoing that substantial expenditure of energy, time and investment is necessary, especially in the case of moldings to be produced in large numbers.

There have therefore been many attempts to dispense with the troublesome water conditioning by adding low molecular weight or high molecular weight modifiers, for example plasticizers, in order thereby to obtain high-impact nylons immediately after processing.

The endeavors were concentrated predominantly on finding high molecular weight impact strength improvers, hereinafter referred to as impact strength modifiers. JA No. 52/104567 (1977) proposes polyethylene or ethylenevinyl acetate copolymers for improving the notched impact strength of nylons, but the moldings produced from the blends showed unsatisfactory resilience characteristics (a tendency to white fracture) because of the incompatibility of the polymers involved, and there is a substantial reduction in flow.

Blends of nylons with polycarbonates are also described in the literature, for example in JA No. 59/68368 (1984) for watch and clock cases and in JA No. 49/33103 (1974) and No. 51/30255 (1976) as a substitute for mother of pearl.

JA No. 50/116541 (1975) and JA No. 50/1147 (1975) state that blends of polycarbonate and nylon 12 exhibit good dielectric properties. However, all the blends show a pronounced tendency to laminar cleavage (delamination) of the moldings produced therefrom.

Finally, DE-A No. 33 32 924 states that blends of nylons and polycarbonates froth very heavily during manufacture, the use of such blends for the production of nylon foams being based on this fact (cf., eg. JA No. 48/28350 (1973) and JA No. 57.16033 (1982)).

SUMMARY OF THE INVENTION

It is an object of the present invention to provide thermoplastic molding materials of nylons and polycarbonates which do not show any delamination in the moldings produced therefrom.

We have found that this object is achieved, according to the invention, by thermoplastic molding materials based on
(A) nylons and
(B) polycarbonates which contain 0.1-30% by weight, based on (A)-(C), of
(C) a polymeric component having hydroxyl groups, —OH.

DETAILED DESCRIPTION OF THE PREFERRED EMBODIMENTS

The thermoplastic molding materials of the present invention contain (A) a nylon, (B) a polycarbonate and (C) a polymeric component having hydroxyl groups, —OH. The polymeric component (C) is present in an amount of 0.1 to 30% by weight based on the total amount of (A), (B) and (C).

The polymeric component (C) can be a polycondensate of an aliphatic and/or an aromatic polyhydric alcohol with an epihalohydrin or a polymer containing 0.1 to 100 mol% of an alcohol having vinylphenyl substituents. The alcohol with vinylphenyl substituents can be a vinylphenol and/or a vinylphenyl carbonyl.

The thermoplastic molding material of this invention can additionally contain an elastomeric component. The nylon (A) can be a partially crystalline nylon. The thermoplastic molding material of this invention can be used to obtain moldings.

As component (A), the thermoplastic molding materials according to the invention contain a nylon or a blend of a plurality of nylons. In principle, partially crystalline and amorphous nylons are suitable, but partially crystalline nylons are preferred, since the molding materials produced therefrom are as a rule superior to amorphous nylons in respect of heat distortion resistance and stress crack resistance. Nylons which may be employed according to the invention are known per se and comprise, for example, nylons having molecular weights of 5,000 or above, as described, for example, in U.S. Pat. Nos. 2,071,250, 2,071,251, 2,130,523, 2,130,948, 2,241,322, 2,312,966, 2,512,906 and 3,393,210.

The nylons may be prepared by, for example, condensing equimolar amounts of a saturated dicarboxylic acid having 4 to 12 carbon atoms and a diamine of 4 to 14 carbon atoms, or by condensing omega-aminocarboxylic acids or by a polyaddition reaction of lactams. Examples of nylons are polyhexamethylene adipamide (nylon 6,6), polyhexamethylene azelaic acid amide (nylon 6,9), polyhexamethylene sebacic acid amide (nylon 6,10), polyhexamethylene dodecanedicarboxylic acid amide (nylon 6,12), the nylons obtained by ring cleavage of lactams, eg. polycaprolactam and polylaurolactam, and also poly-11-aminoundecanoic acid and poly-di-(p-aminocyclohexyl)-methanedodecanedicarboxylic acid amide. The invention also permits the use of nylons obtained by copolycondensation of two or more of the above polymers or of their components, eg. a copolymer of adipic acid, isophthalic acid and hexamethylenediamine. Preferably, the nylons are linear and have melting points above 200° C.

Preferred nylons are polyhexamethylene adipamide, polyhexamethylene sebacic acid amide and polycaprolactam. The nylons in general have a relative viscosity of from 2.5 to 5, determined on a 1% strength solution in H₂SO₄ at 23° C., which corresponds to a molecular weight of about 15,000–45,000. Of course, blends of nylons may also be employed. The proportion of nylon (A) in the molding materials according to the invention is not critical, but preferably at least 2% by weight of nylon, based on the total weight of (A)–(C), are employed. Molding materials containing 20–78, especially 30–65, % by weight of nylon are especially preferred.

The polycarbonates (B) used according to the invention are also known per se. They may be prepared, for example, by the process of German Pat. No. 1,300,266 by phase boundary polycondensation or according to German Laid-Open Application NOS No. 1,495,730 by reacting diphenyl carbonate with bisphenol A (2,2-di-(4-hydroxy-phenyl)-propane). In place of bisphenol A, other dihydroxy compounds may be employed, for example 2,2-di-(4-hydroxy-phenyl)-pentane, 2,6-dihydroxynaphthalene, di-(4-hydroxy-phenyl)-sulfone, di-(4-hydroxyphenyl)ether, di-(4-hydroxy-phenyl)sulfite, di(4-hydroxyphenyl)-methane, 1,1-di-(4-hydroxy-phenyl)-ethane and 4,4-dihydroxydiphenyl, to mention only a few which have proved particularly advantageous. Further suitable compounds may be found in, for example, the monograph by H. Schnell, Chemistry and Physics of Polycarbonates (Interscience Publishers, 1964). Of course, mixtures of different dihydroxy compounds may also be employed.

Aromatic polycarbonates having a relative viscosity of 1.2–1.5, especially of 1.28–1.40 (measured as an 0.5% strength solution in methylene chloride at 25° C.) are particularly suitable.

The content of component (B) in the molding materials according to the invention is, like the content of component (A), not critical, but is in general not less than 2% by weight; contents of 20–78, especially 30–65, % by weight of (B), based on the total weight of components (A)–(C), are preferred.

As the essential component (C), the molding materials according to the invention contain a polymeric component having hydroxyl groups, —OH. Experiments carried out in the course of the invention have shown that whereas in principle any group having proton donor properties should be suitable, only groups comprising the structural unit OH are particularly suitable. The compatibility-improving action of component (C) is probably due to the fact that interactions, for example hydrogen bridge bonds, occur between component (C) and components (A) and (B), resulting in improved mutual adhesion of the phases.

As already mentioned, all polymers having hydroxyl groups which are essentially freely available are in principle suitable. Of course, it is necessary to ensure that components (A) and (B) are stable to component (C). This requires particular attention when using compounds having acidic OH groups.

Given due observation of these preconditions, some groups of compounds have proved particularly advantageous and these are described below. However, in principle it is also possible to employ other components (C), provided the stability of components (A) and (B) does not suffer as a result.

The first group of particularly suitable polymers comprises polycondensates of aliphatic or aromatic diols or of polyhydric alcohols with epihalohydrins. Such compounds, and processes for their preparation, are known to those skilled in the art, and hence further details are not required here. As examples only, there may be mentioned polycondensates of epihalohydrins with dihydroxy compounds which may also be employed to prepare the polycarbonates (B), these polycondensates having proved particularly advantageous. However, apart from these, other diols, especially aliphatic diols, or polyhydric aromatic or aliphatic alcohols may also, in principle, be employed.

Because of its easy accessibility, a polycondensate of bisphenol A and epichlorohydrin, having the structure

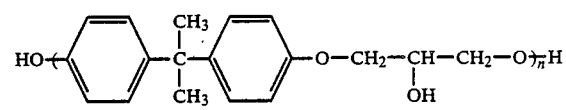

is preferred.

In addition to the possibility of using polymers which already possess a hydroxyl group in the main chain, it is possible to use polymers or copolymers which acquire this functional group through the conjoint use of suitable monomers during the polymerization in which case the groups may then again be present in the main chain of the polymers, but may also be present in substituents of the main chain. A further possible approach is to graft suitable monomers having OH groups onto grafting bases, all polymers which are not completely incompatible with (A) and (B) being, as a matter of principle, suitable as grafting bases. A certain degree of incompatibility can be compensated by increasing the content of hydroxyl groups.

Accordingly, suitable components (C) are polymers based on polyolefins, polystyrene and rubbery elastomers which contain hydroxyl groups, —OH, which polymers are obtainable either by using suitable comonomers or by grafting-on of the —OH functional groups. The proportion of comonomers or grafting monomers with hydroxyl groups —OH depends on how readily compatible the base polymer is with components (A) and (B). The better the compatibility, the lower the content of OH groups can be. It follows from the above that a large number of polymeric compounds are suitable components (C), of which some particularly preferred types are presented in more detail below, only by way of example.

The first group comprises polymers and copolymers containing up to 100 mol% of vinylphenylcarbinols, with vinylphenyldimethylcarbinols and especially vinylphenylhexafluorodimethylcarbinol having proved particularly suitable. Advantageous base polymers or grafting bases to use are, once again, the types of polymers mentioned above.

A second group comprises polymers based on vinyl phenols and copolymers of the above mentioned grafting bases or base polymers with vinylphenols, which vinylphenols may or may not be nuclear-substituted. Substituents which increase the acidity of the phenolic hydrogen, for example halogen substituents, but also other electron-attracting substituents, are particularly suitable.

In addition, basically polymers and copolymers containing any polymerizable or graftable alcohol may be mentioned.

Polymers containing OH groups and based on nylons or polycarbonates are particularly preferred, since in that case compatibility with at least component (A) or (B) is assured a priori, so that the content of OH groups can be lowered.

Component (C) can be prepared by conventional processes of polycondensation, graft polymerization or copolymerization, and accordingly further details need not be given here.

The content of component C in the molding materials according to the invention is 0.1–30% by weight, based on the total weight of components (A)–(C), and depends on the compatibility of the base polymer of component (C) with components (A) and (B). In general, contents of component (C) of 1–25, especially 3–20, % by weight have proved particularly advantageous.

In addition to components (A)–(C), the molding materials according to the invention can contain additives to improve the impact strength and conventional adjuvants and processing assistants. Elastomers which improve the impact strength of nylons or polycarbonates are known per se to a main skilled in the art, and accordingly details need not be given here. Only by way of example, there may be mentioned rubbers based on ethylene, propylene, butadiene or acrylates, or on mixtures of these monomers. The content of such impact strength improvers is in general not more than 40% by weight, and in particular up to 30% by weight, based on the total weight of components (A)–(C).

Amongst other adjuvants there may be mentioned again only by way of examples—lubricants and mold release agents, nucleating agents, pigments, flameproofing agents, colorants, stabilizers, crystallization accelerators, fibrous and pulverulent fillers and reinforcing agents, and antistatic agents, any of these being added in the conventional amounts.

The molding materials according to the invention may be prepared by mixing processes known per se, for example by working the polycarbonate into the nylon at above the melting point of the latter, especially at 220°–300° C., more particularly at 230°–280° C., in conventional mixing equipment such as extruders, kneaders and blenders.

Moldings having good surface characteristics and improved impact strength, coupled with high rigidity, especially at low temperatures, may readily be produced from the molding materials according to the invention. No phase separation of the polymer components occurs either in the molding or in the melt.

EXAMPLES

The following starting materials were employed to prepare thermoplastic molding materials according to the invention.

Component A (nylon):
A1: Polyhexamethylene adipamide having a relative viscosity of 3.31, measured on a 1% strength solution in 96% $H_2SO_4$ at 25° C.
A2: Polycaprolactam having a relative viscosity of 4.0 (measured as for A1)
A3: Polyhexamethylene sebacic amide having a relative viscosity of 3.23 (measured as for A1)
Component B:
B1: A polycarbonate based on 2,2-di-4-hydroxyphenyl)-propane (bisphenol A) and having a relative viscosity of 1.36, measured on an 0.5% strength solution in methylene chloride at 25° C.
Component C:
C1: A polycondensate of 2,2-di-(4-hydroxyphenyl)-propane and epichlorohydrin (phenoxy TM, from Union Carbide) and having a relative viscosity of 1.13, measured as for B1.
Structure:

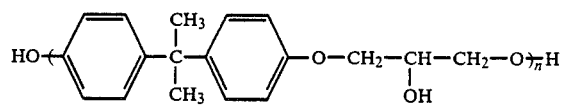

In experiment 8, a grafted rubber having a grafting base (75%) of polybutadiene and a grafted covering (25%) of a copolymer of styrene and acrylonitrile (in the weight ratio of 75/25) was employed to improve the impact strength, the grafted rubber having been prepared by emulsion polymerization in a manner known per se.

The molding materials were prepared by thoroughly mixing the components, melting and homogenizing them in a twin screw extruder (ZDSK 28, Werner & Pfleiderer) at 250° C. and extruding the blend into a waterbath. After it had been granulated and dried, the blend was molded on an injection molding machine to give test specimens, and these were examined without additional after-treatment.

The notched impact strength was determined according to DIN 53753. The results are shown in Table 1 alongside the composition of the individual molding materials (all % are by weight).

TABLE 1

| Experiment No. | Component A % | Component B % | Component C % | K[1] % | Notched impact strength (kJ/m²) 23° C. | −20° C. | −40° C. |
|---|---|---|---|---|---|---|---|
| 1* | 50 A1 | 50 | — | — | 4.0 | 3.2 | 2.1 |
| 2* | 50 A2 | 50 | — | — | 6.0 | 5.2 | 4.1 |
| 3* | 50 A3 | 50 | — | — | 64 | 20 | 15 |
| 4 | 45 A1 | 45 | 10 | — | 90 | 78 | 52 |
| 5 | 48 A2 | 48 | 4 | — | 60 | 30 | 20 |
| 6 | 45 A2 | 45 | 10 | — | 124 | 80 | 55 |
| 7 | 45 A3 | 45 | 10 | — | 110 | 100 | 90 |
| 8 | 45 A3 | 45 | 5 | 5 | 121 | 115 | 98 |

[1]Grafted rubber as described above
*Comparative examples

The results in the Table show that the thermoplastic molding materials according to the invention are distinguished by markedly better notched impact strength than that of conventional nylon/polycarbonate blends. Similar results may be expected in respect of the biaxial impact strength.

We claim:
1. A thermoplastic molding material, comprising:
(A) a nylon in an amount from 20 to 78 wt.%;
(B) a polycarbonate in an amount of from 20 to 78 wt.%; and
(C) a polymeric component having hydroxyl groups, —OH, in an amount from 0.1 to 30 wt.%;
wherein said wt.% are based on the sum of (A), (B) and (C).
2. The thermoplastic material of claim 1, wherein said polymeric component (C) is a polycondensate of an aliphatic polyhydric alcohol or an aromatic polyhydric alcohol with an epihalohydrin, or wherein said polymeric component (C) is a polymer containing 0.1 to 100 mol% of an alcohol having vinylphenyl substituents.

3. The thermoplastic molding material of claim 2, wherein said alcohol having vinylphenyl substituents is a vinylphenol, a vinylphenyl carbinol, or a mixture thereof.

4. The thermoplastic molding material of claim 1, further comprising an elastomeric component.

5. The thermoplastic molding material of claim 1, wherein said nylon (A) is a partially crystalline nylon.

6. The thermoplastic molding material of claim 1, wherein said nylon (A) is a blend of a plurality of nylons.

7. The thermoplastic molding material of claim 1, wherein said nylon (A) is obtained by condensing a $C_{4-12}$ saturated dicarboxylic acid with a $C_{4-14}$ diamine, or by condensing an $\Omega$-amino carboxylic acid, or by a lactam polyaddition reaction.

8. The thermoplastic molding material of claim 1, wherein said nylon (A) comprises polyhexamethylene adipamide (nylon 6,6); polyhexamethylene azelaic acid amide (nylon 6,9); polyhexamethylene sebacic acid amide (nylon 6,10); polyhexamethylene dodecanedicarboxylic acid amide (nylon 6,12); a nylon obtained by ring cleavage of a lactam; poly-11-aminoundecanoic acid; or poly-di-(p-aminocyclohexyl)-methanedodecanedicarboxylic acid amide.

9. The thermoplastic molding material of claim 1, wherein said nylon (A) is polyhexamethylene adipamide, polyhexamethylene sebacic acid amide, or polycaprolactam.

10. The thermoplastic molding material of claim 1, wherein said polycarbonate (B) is obtained by reacting a diphenylcarbonate with a dihydroxy compound.

11. The thermoplastic molding material of claim 10, wherein said dihydroxy compound comprises bisphenol A (2,2-di-(4-hydroxy-phenyl)-propane; 2,2-di-(4-hydroxy-phenyl)-pentane; 2,6-dihydroxynaphthalene; di-(4-hydroxy-phenyl)-sulfone; di-(4-hydroxyphenyl)ether; di-(4-dihydroxy-phenyl)sulfite; di-(4-hydroxyphenyl)methane; 1,1-di-(4-hydroxyphenyl)-ethane; or 4,4-dihydroxydiphenyl.

12. The thermoplastic molding material of claim 1, wherein said polycarbonate (B) is an aromatic polycarbonate having a relative viscosity of from 1.2 to 1.5 as measured as a 0.5% strength solution in methylene chloride at 25° C.

13. The thermoplastic molding material of claim 1 wherein said polymeric component (C) is a polycondensate of (1) an aliphatic diol, an aromatic diol or a polyhydric alcohol with (2) an epihalohydrin.

14. The thermoplastic molding material of claim 1, wherein said polymeric component (C) comprises an aliphatic diol, a polyhydric aromatic alcohol, or a polyhydric aliphatic alcohol.

15. The thermoplastic molding material of claim 1, wherein said polymeric component (C) comprises bisphenol A (2,2-di-(4-hydroxy-phenyl)-propane; 2,2-di-(4-hydroxy-phenyl)-pentane; 2,6-dihydroxynaphthalene; di-(4-hydroxy-phenyl)-sulfone; di-(4-hydroxyphenyl)ether; di-(4-dihydroxy-phenyl)sulfite; di-(4-hydroxyphenyl)-methane; 1,1-di-(4-hydroxyphenyl)ethane; 4,4-dihydroxydiphenyl, or an aliphatic alcohol.

16. The thermoplastic molding material of claim 1, wherein said polymeric component (C) is a polycondensate of bisphenol A and epichlorohydrin having the structure:

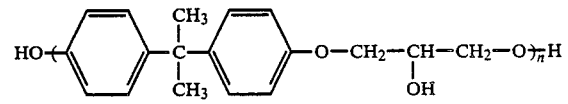

and having a relative viscosity of 1.13, measured on an 0.5% strength solution in methylene chloride at 25° C.

17. The thermoplastic molding material of claim 1, wherein said polymeric component (C) is a polymer based on a polyolefin, a polymer based on polystyrene, or a polymer based on a rubber elastomer.

18. The thermoplastic molding material of claim 1, wherein said polymeric component (C) is a vinylphenyl carbinol.

19. The thermoplastic molding material of claim 18, wherein said vinylphenyl carbinol is a vinylphenyl dimethyl carbinol or vinylphenyl hexafluorodimethyl carbinol.

20. The thermoplastic molding material of claim 1, wherein said polymeric component (C) is a polymer based on a vinylphenol or a copolymer based on a polyolefin, polystyrene, or a rubber elastomer and a vinylphenol.

21. The thermoplastic molding material of claim 1, wherein said polymeric component (C) is a polymer based on said nylon or said polycarbonate, and containing —OH groups.

22. A molding obtained from a thermoplastic molding material comprising (A) a nylon in an amount of from 20 to 78 wt.%, (B) a polycarbonate in an amount of from 20 to 78 wt.%, and (C) a polymeric component having hydroxyl groups, —OH, in an amount of from 0.1 to 30 wt.%, said wt.% being based on the sum of (A), (B), and (C).

23. The molding of claim 22, wherein said polymeric component (C) is a polycondensate of an aliphatic polyhydric alcohol or an aromatic polyhydric alcohol with a epihalohydrin, or a polymer containing 0.1 to 100 mol% of an alcohol having vinylphenyl substituents.

* * * * *